United States Patent [19]

Douglas et al.

[11] 4,032,941
[45] June 28, 1977

[54] LATCHED SHUTTER SYSTEM HAVING AUTOMATIC DELAY OF LATCH RESET

[75] Inventors: Lawrence M. Douglas, South Easton; Patrick L. Finelli, Sudbury; Norman D. Staller, Beverly; Frederick Slavitter, Needham, all of Mass.

[73] Assignee: Polaroid Corporation, Cambridge, Mass.

[22] Filed: Aug. 28, 1975

[21] Appl. No.: 608,677

[52] U.S. Cl. .................. 354/230; 354/235
[51] Int. Cl.² ........................................ G03B 9/08
[58] Field of Search ............ 354/26, 30, 230, 234, 354/235, 245, 246, 247, 254, 268

[56] References Cited

UNITED STATES PATENTS

| | | | |
|---|---|---|---|
| 3,832,722 | 8/1974 | Douglas | 354/30 X |
| 3,873,987 | 3/1975 | Braüning et al. | 354/230 X |
| 3,893,134 | 7/1975 | Braüning et al. | 354/30 |
| 3,896,458 | 7/1975 | Johnson et al. | 354/230 X |
| 3,903,538 | 9/1975 | Yoshizaki | 354/234 |

*Primary Examiner*—L. T. Hix
*Assistant Examiner*—William B. Perkey
*Attorney, Agent, or Firm*—David R. Thornton

[57] ABSTRACT

An exposure control system for photographic apparatus utilizing electrically controlled shutter-diaphragm blades mechanically latched in a light-blocking condition in conjunction with a latch actuator which delays return of the released latch to the blade path prior to commencement of the exposure interval during which scene light is passed to the film. In the illustrated embodiment, the actuator enables a latch element for release and energizes the blades to draw them slightly further in a light-blocking direction from the latched position so as to release the latch just prior to initiation of the exposure interval, and the actuator includes an over center spring arrangement which provides a decrease in the required force of actuation as the system is electrically energized so that the operator inherently holds the actuator in an operating position with the latch element held out of blade engagement for a time sufficient to allow escape of the blades from the latch position.

9 Claims, 7 Drawing Figures

LATCHED SHUTTER SYSTEM HAVING AUTOMATIC DELAY OF LATCH RESET

BACKGROUND OF THE INVENTION

This invention relates to photographic exposure control systems and, more particularly, to an automatic exposure control system employing a shutter latching arrangement.

A compact, single-lens reflex (SLR) camera having an electrically driven shutter-diaphragm system is described in the U.S. Pat. No. 3,820,128 issued to John P. Burgarella et al. on June 25, 1974. The shutter-diaphragm system of that camera employs a pair of light-regulating blades mechanically biased to an open or viewing orientation and electromagnetically driven to a closed orientation such that the above system provides an open shutter orientation in the "off" condition of the camera. Modification of the above exposure system to render it suitable for non-SLR use by providing a normally closed shutter orientation is described and claimed in the commonly assigned, copending application Ser. No. 608,663, U.S. Pat. No. 3,995,295, of Lawrence M. Douglas filed herewith in which a shutter latch configured for holding the blades in a light-blocking orientation is released responsive to electrical control and actuation of the blade drive.

The latched blade arrangement of the above-noted copending application provides an economical, electrically controlled shutter system having a normally closed blade orientation while still preserving the electrically driven blade closing arrangement described in the above-referenced patent. However, since the return of the latch mechanism to its latch position is under the control of the camera operator, the latter can interfere with the automatic exposure sequence particularly where the automatic system includes timed events occuring prior to actual commencement of the exposure interval. For example, if minimum modification is desired for the system described in the above noted patent, the pre-exposure interval, normally employed for altering the system from viewing to exposure condition and which occurs between initial electrical actuation and shutter opening, must be accomodated. Hence, it is desirable to provide a shutter latch mechanism which is retained in a released condition until sufficient sequencing of the shutter system to ensure completion of the exposure cycle.

Consequently, an important object of this invention is to provide an improved automatic exposure control system.

Another object of this invention is to provide a shutter system having an improved latching arrangement.

Still another object of this invention is to provide an exposure control system having an economical, compact actuator and latch combination.

A further object of this invention is to provide a shutter latching arrangement which will not interfere with the exposure cycle.

A still further object of this invention is to provide an exposure control system having a latched shutter arrangement releaseable in accordance with electromechanical control.

SUMMARY OF THE INVENTION

In accordance with the general concept, the exposure control system of the invention includes a reliable shutter latching arrangement which requires shutter actuation for latch release and delays re-positioning of the latch in a latching location until commencement of exposure. Thus, in accordance with the invention, the exposure control system includes an actuator which delays return of a latch element to the path of a shutter blade path prior to commencement of an exposure interval. In the illustrated embodiment, displacement of an actuator element unlocks the latch and energizes the system; the latter then releasing the latch to a non-latching position out of the shutter blade path. Included in the actuator is an over center spring mechanism providing a step-like increase and decrease in the actuation force so as to provide an inherent delay in operator release of the actuator thereby delaying return of the latch to its latching position.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
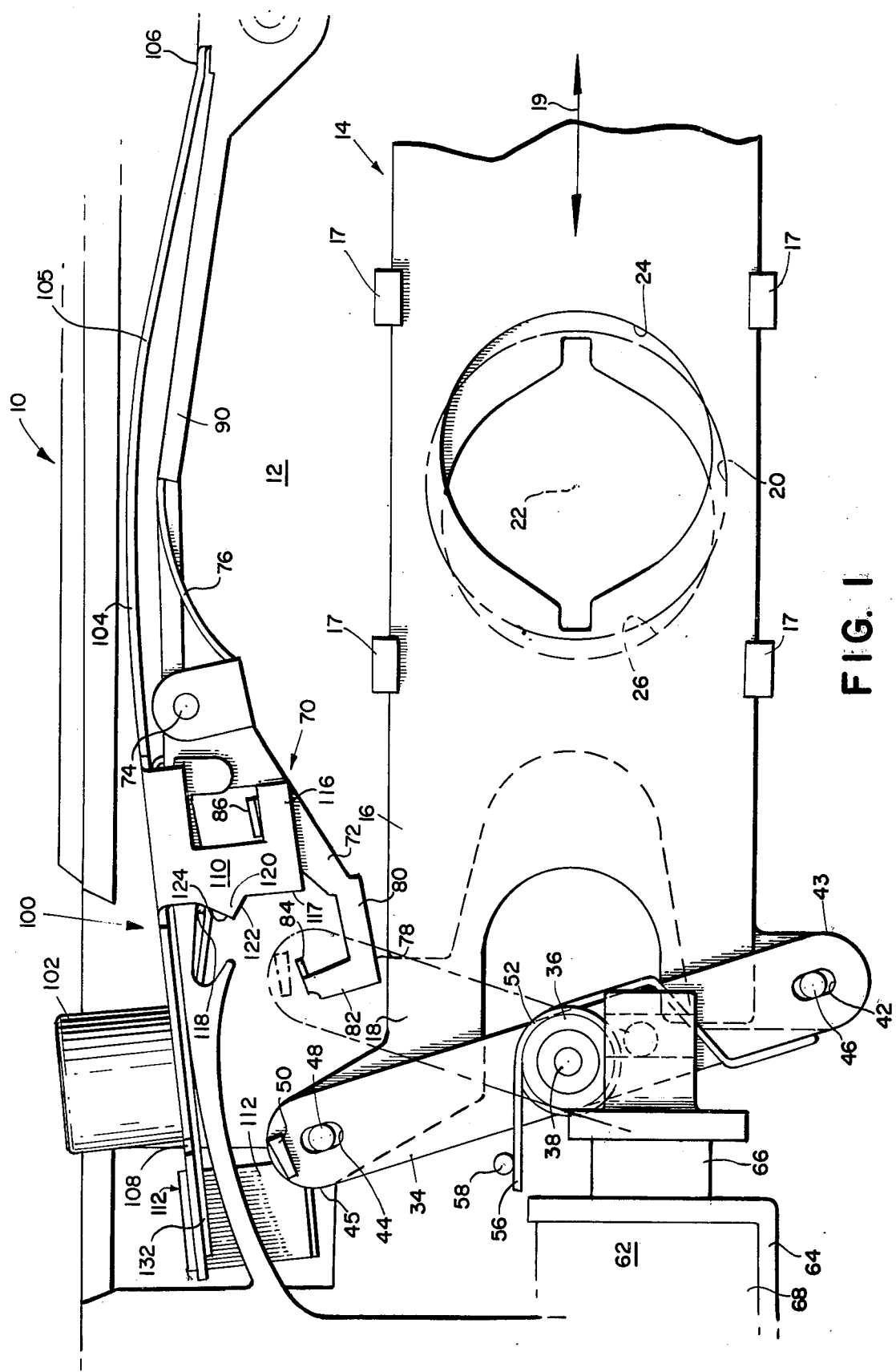
FIG. 1 is a diagrammatic, fragmentary, front elevational view of an exposure control system incorporating features of the instant invention, the view having portions broken away or removed to reveal internal structure.

Referring to FIG. 1, the basic components of a shutter-diaphragm exposure mechanism are revealed in detail as they are present within an exposure housing 10. Mounted upon a rear casting 12 within the housing 10, an exposure blade mechanism, shown generally at 14, is formed having two cooperatively moving shutter-diaphragm blades 16 and 18 intercoupled by a walking beam 34. Blades 16 and 18 slide horizontally within mounting brackets depicted at 17 along a given blade path designated by the arrow 19 in FIG. 1 across an aperture 20 defining the entrance of the camera optical path depicted at 22. Each of the blades, 16 and 18, is formed having a selectively shaped main opening, respectively depicted at 24 and 26, movable across the optical path of the camera 22 to symmetrically overlap thereat and thereby define selectively varying, main or primary aperture values. Each blade, 16 and 18, additionally includes a corresponding photocell sweep opening (not shown) which moves in correspondence with the respective main aperture openings 24 and 26 to define secondary aperture values over the path of a photocell (not shown) forming an active element of a light-integrating network 32 depicted in FIG. 7. A suitable light-integrating network is described in U.S. Pat. No. 3,620,143.

When displaced, as later explained, blades 16 and 18 define a continuous progression of apertures over both optical path 22 and the photocell (not shown) as a result of their mutual connection with the walking beam 34. The latter is formed having a centrally disposed hub portion 36 which is journaled for rotation about an upstanding stud (not shown) fixed within and extending from rear casting 12. A pin 38 secures the hub portion 36 over the above-noted upstanding stud. Elongate slots, as at 42 and 44, are formed in the outward tip portions 43 and 45, respectively, of beam 34 for the purpose of providing connection with studs or pins 46 and 48 extending, respectively, from blades 18 and 16. A projection 50 carried at the upper end 45 of the beam 34 extends perpendicular to the plane of the blades and as later explained is employed for latching the blades in their closed orientation.

The beam 34 is mechanically biased for counterclockwise rotation tending to displace the blades 16 and 18 from the blocking positions (shown in FIGS. 2, 3 and 4) wherein openings 24 and 26 are out of registration to an open orientation shown in FIG. 1 by means of a spring 52, the central portion of which is wound about the hub 36. The movable end of the spring 52 being configured for biased contact against the beam 34, while its stationary end 56 is configured to abut against a pin 58 extending from the rear casting 12. With the spring 52 so connected, the exposure mechanism is biased for movement toward the open orientation illustrated in FIG. 1.

Clockwise rotation of the beam 34 and resultant movement of blades 16 and 18 into a closed orientation blocking the passage of light along the optical path of the camera 22 is carried out by an electromagnetic drive operative to provide a driven mode of operation. This electromagnetic drive is present as a solenoid 62 mounted upon rear casting 12 by means of a solenoid bracket 64. The solenoid 62 includes an internally disposed cylindrical plunger 66 which retracts inwardly into its spiral winding and associated casing 68 upon energization thereof. When solenoid 62 is so energized, walking beam 34 is rotated rapidly clockwise to move blades 16 and 18 into the terminal blocking position shown in FIG. 4.

Hence, it should be understood that the spring 52 provides means for biasing the blade mechanism 14 to an open position alternately, a compression spring, not shown, may be employed around the plunger 66 to bias the latter out of the solenoid winding 68. Further, the solenoid 62 provides means actuatable to displace the blades to their terminal blocking position. Together the spring 52 and the solenoid 62 provide means actuatable for displacing the blades from a closed to an open position and back again so as to define an exposure interval during which scene light is transmitted along the optical axis 22 to the camera focal plane (not shown).

Although the blades 16 and 18 are biased in an opening direction, the exposure mechanism 14 is held, by means of a blade latch 70, in a latched, blocking position (shown in FIG. 2) when the camera is not undergoing an exposure cycle. As later explained in detail with regard to the overall system operation, the terminal blocking position (see FIG. 4) is shifted slightly in the blocking direction from the latched, blocking position of FIG. 2.

The blade latch 70 includes an elongated latch arm 72 pivotally mounted on a stud 74 of the casting 12 and having one end 76 formed as a leaf spring while the other end 78 is configured for latching engagement with the beam projection 50. A projecting strut 90 of the casting 12 engages the spring 76 so that the latter tends to bias the latch arm 72 counterclockwise around the pivot 74 thereby urging the latching end 78 downward toward the position shown in FIG. 1; downward movement of the latter being controlled by an actuator 100, as later explained in detail, which engages a laterally projecting lug 86 of the latch arm 72.

Figure 2:
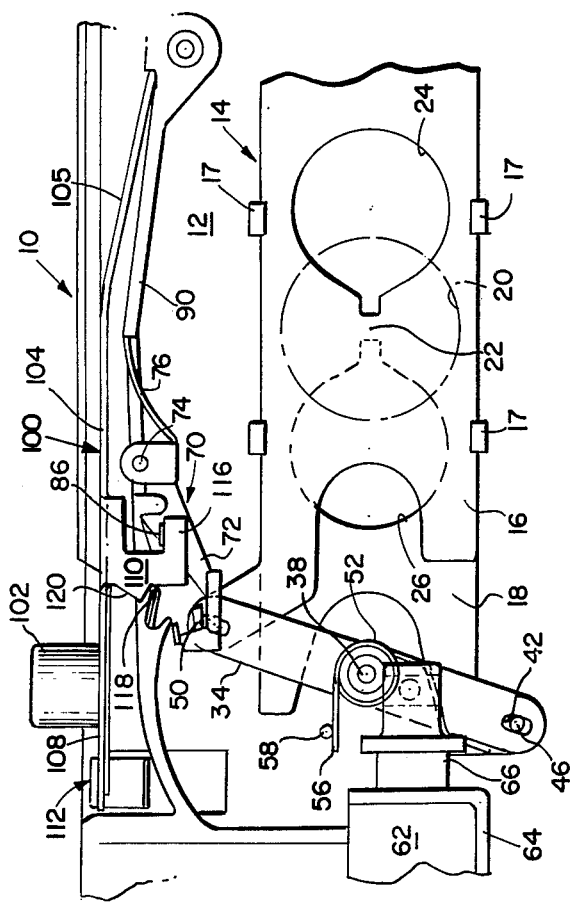
FIG. 2 is a front elevational view of the exposure mechanism of FIG. 1 showing the orientation of the components thereof prior to actuation of the system.
Figure 4:
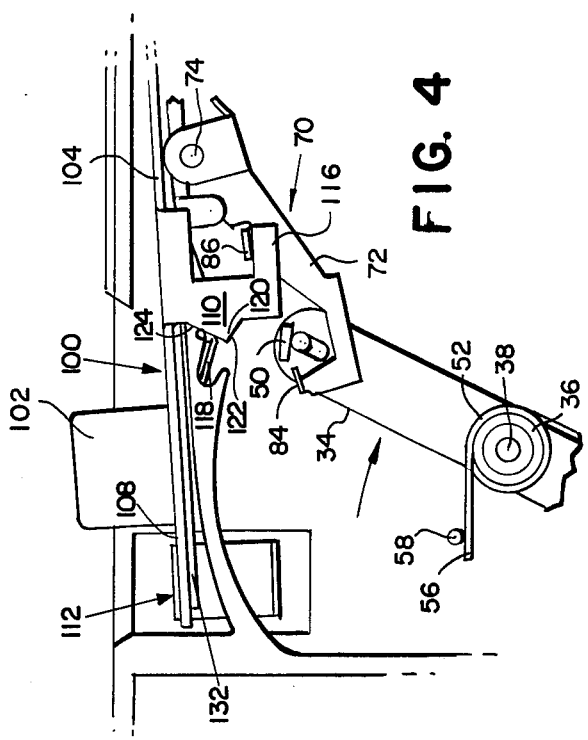
FIG. 4 is a front elevational view of the exposure control mechanism of FIG. 1 showing the orientation of the components thereof responsive to electrical energization.
Figure 3:
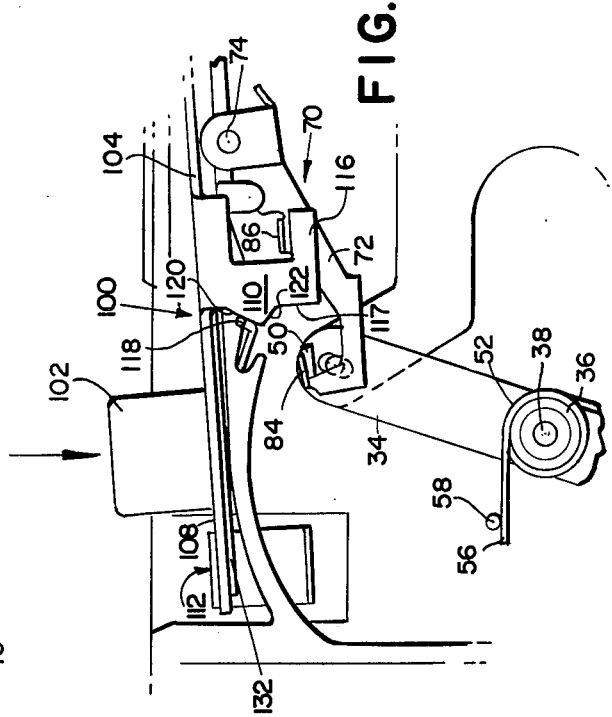
FIG. 3 is an elevational view of the mechanism of FIG. 1 showing the orientation of the components thereof during initiation of system actuation.

The latching end 78 of the latch 70 is formed as a "C" shaped member located in overlying relation to the path of travel of the beam end 45 and includes a base portion 80 normally extending in generally parallel relation to the blade path 19, an upright arm portion 82, and a top plate 84 folded back over the base 80. As later explained with regard to the operation of the latch, in the non-operating mode of the system, the upright arm portion 82 is configured to engage the beam projection 50 and hold the beam 34 (against the bias of the blade spring 52) in a latched blocking position shown in FIG. 2. During initial stages of actuation, the top plate 84 is arranged to contact with the projection 50 and temporarily retain the latch in latching engagement with the beam projection 50 as shown in FIG. 3 until the blades are moved further in a closed direction as shown in FIG. 4. Consequently, as later described in detail with regard to overall operation of the exposure mechanism, the blade latch 70 is not actually released until the blade mechanism 14 has been actuated. Hence it should be understood that the projection 50 provides means carried by the blades for engaging and cooperating with the latch to hold the blades in a closed arrangement.

Initial control over the blade latch arm 72 is provided by the actuator 100 which includes a pushbutton 102 and an elongated actuator member 104 mounted in cantilevered fashion on the casting 12. Spring flat stock is employed to form the actuator member 104 and provides a spring arm portion 105 affixed to one end 106 to the casting 12 such that the free end 108, which carries the pushbutton 102 is baised upwardly toward the inoperative position of the actuator, as shown in FIG. 2. Formed as part of the free end 108 of the actuator 104 is a latch actuator section 110 and a switch actuator section 112 which respectively control the operation of the blade latch 70 and a switch arm 132 of an electrical switch 130, later explained in detail with regard to FIGS. 5 and 6.

The latch actuator section 110 is formed as a C shaped member extending downwardly from the actuator member 104 parallel to the plane of the blades 16, 18 and in overlying relation to the latch arm 72, with a lower arm section 116 located under the latch lug 86. Carried on the leading edge 117 of the actuator section 110 in engagement with a spring 118 is a cam 120. The latter having a first or bottom cam face 122 and a second or top cam face 124 of different shapes which, as explained below, cooperate with the spring 118 to provide control over the movement of the actuator 100.

The cam 120 employs a steep cam angle 122 on the lower edge so as to require a reasonable force for actuation of the system, which provides an inherent delay before the subsequent de-activation. On the other hand, a more shallow cam angle 124 is provided on the upper cam face so as to require only a low return force.

The cam and spring arrangement are included to preclude premature release of the actuator 100 which could reset the latch 70 in the beam path prior to actual commencement of an exposure interval or, that is, prior to displacement of the blades in the opening direction past the latch. In this regard, the actuator arrangement provides a snap-type actuation where the force required for actuation rises sharply to a peak, as the lower cam 122 is driven into engagement with the spring 118, and then falls off rapidly as this cam face drops off the spring. Enablement of the latch and energization of the system as later explained in detail only occurs after the peak force has been exceeded and, hence, during the decreasing force portion of the actuator cycle.

Consequently, the peak force arrangement requires sufficient force to preclude inadvertent triggering due to mere touching of the pushbutton 102 and, more importantly, requires that the operator exceed a peak force, which while relatively light, inherently causes a slight operator delay before release. Stated otherwise, in order to enable the latch arm 72, the operator is required to force the cam 120 over the spring 118. Once the operator accomplishes the latter, his reflex time before he can release the pushbutton 102 provides a sufficient delay, for escape of the blades from the latch, or that is, movement of the beam projection 50 past the latch in the opening direction.

Figure 5:
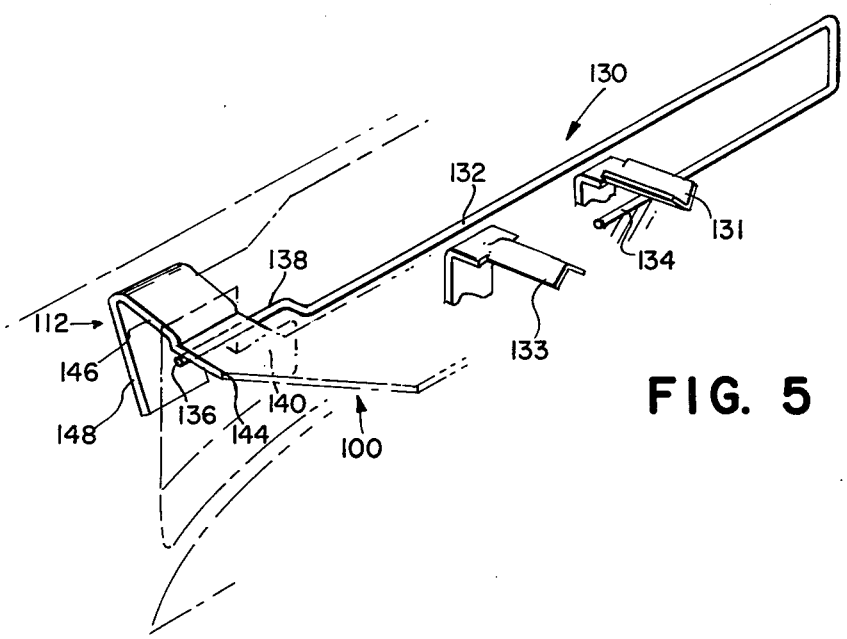
FIG. 5 is an enlarged perspective view of the switch portion of the mechanism of FIG. 1 illustrating the initial position of the switch components.
Figure 6:
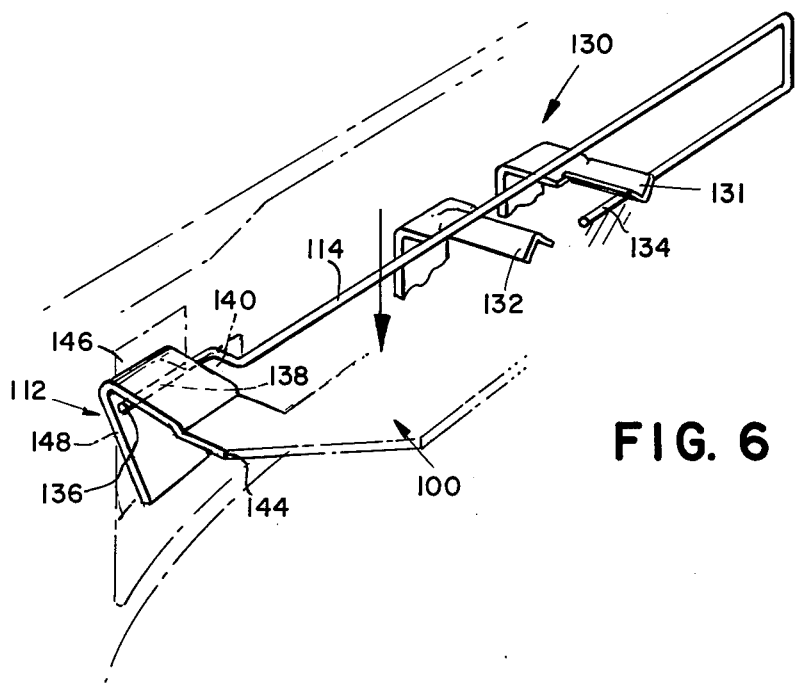
FIG. 6 is a perspective view of the switch of FIG. 5 illustrating the operative position of the components thereof.

Turning now to FIGS. 5 and 6 wherein the switch 130 is shown, it can be seen that the switch includes a pair of contacts 131 and 133, mounted on the casting 12 (which is preferably of insulative material, e.g., plastic). The contacts 131 and 133 are configured, when interconnected by the switch arm 132, for coupling a battery (not shown) or other source of energy to the exposure system circuit as later explained in detail with regard to FIG. 7.

As noted in FIGS. 5 and 6, the switch arm 132, which is a wire-like member affixed at one end 134 to the casting 12 where it is in permanent connection to one of the contacts 131, extends from beneath the latter and is bent back above both contacts in a spring-like arrangement such that its free end 136 may be driven downwardly by the switch actuator section 112 and thereby forced into connection with the top of the other contact 133 to complete a connection between the two contacts.

Formed in the free end 136 of the switch arm 132 is a step or offset 138 which, when driven downwardly into its "on" position shown in FIG. 6, drops into an indent 140 in the rear casting 12; the indent tending to retain or latch the switch arm in this on position until the latter is released by the actuator section 112 as explained below. Hence, the indent 140 provides means for latching the switch 130 in its on position.

To facilitate latching of the switch 130, the switch arm 132 is mounted in a manner tending to bias the offset 138 against the casting 12. Additionally, the switch actuator section 112 includes an offset section 146 which exerts a rearward and forward force on the switch arm 132 to facilitate latching of the switch arm during the downward stroke and a flap section 148 which exerts an upward and forward force on the switch arm tending to draw the offset from the indent during the upward or release stroke of the actuator 100.

To accomplish these functions, the switch actuator portion 112 extends rearwardly from the actuator 100 over and behind the switch arm 132 and comprises a first planar section 144 adjoining the actuator body 104 to which the upwardly offset section 146 is attached and is then terminated by the depending flap section 148 which is canted back underneath the offset 146. In this regard, the offset section 146 is upwardly inclined from the section 144 so as to provide a first cam arrangement tending to drive the switch arm 132 rearwardly during the down stroke, and the section 148 is inclined downwardly and forwardly in a second cam arrangement tending to cam the switch arm 132 out of the indent 140 during the upward stroke.

The operation of the switch 130 will now be explained. Depression of the actuator 100 exerts a force on the switch arm 132, bending it downwardly into engagement with the contact 133. As the switch arm reaches the indent 140, it is urged thereinto by means of the camming offset 146 and the spring bias of arm 132 against the casting 12. Upon release of the actuator 100, which displaces the switch actuator portion 112 upwardly, its inclined flap section 148 engages the switch arm 132 and cams it forwardly away from the casting 12 and out of the indent 140 thereby releasing or opening the switch 130. Hence, the offset section 146 provides means responsive to downward displacement for camming the switch arm 132 into its latched position, while the flap section 148 provides means responsive to the upward displacement for camming the switch arm from its latch position.

As later explained in detail with regard to the system operation, the blade latch 70 is enabled by the depression of the actuator 100, but actually released by electrical actuation of the blade mechanism 14; more particularly by energization of the solenoid 62 to draw the blades 16 and 18 slightly further in a closing direction from the latched position shown in FIG. 2 to the terminal blocking position shown in FIG. 4 wherein the beam 34 and its projection 50 are displaced laterally from latch arm 72 thereby releasing the latter. To accomplish this end, the opening and closing of the switch 106 is in timed relation to the unlocking of the latch arm 72 as explained below.

The switch 130 and the switch actuator section 112 are positioned with respect to the latch arm 72 and its actuator portion 110 so that during the downward stroke of the actuator 100, the latch arm 72 is unlocked or enabled for blade release just prior to turning on of the switch 130, and the latter is then held on (by the indent 140) until just following re-setting or locking of the latch arm 72 in its latching position during the upward stroke of the actuator.

As shown in FIG. 5, the switch arm 130 is self-biased upward to a de-activated or off position and requires a given force to displace it to its activated or on position shown in FIG. 6. The planar section 144 of actuator section 112 is arranged so as to displace the switch arm 132 to its on position just subsequent to enablement of the latch arm 72, and more importantly subsequent to displacement of the cam 120 over the spring 118, the latter committing the operator to a delay in releasing the pushbutton until the beam has escaped in an opening direction from the blade latch 70, or that is, until the exposure operation has actually commenced.

Conversely, when the pushbutton 102 is released, the mechanical re-setting of the latch arm 72 in the blade path precedes de-activation of the switch 130. Hence, the flap 148 is spaced in respect to the switch arm 132 and the latch actuator section 110 so as to cam the switch arm out of the indent 140 to its off position subsequent to lifting of the latch arm 72 to its latching position in the blade path.

In regard to the sequence of the operation, it should be noted that since the latch is released only by electrical actuation of the drive means, the required delay or hold of the button need only be related to the switch 130. That is, the latch could be enabled prior to or simultaneously with the lower cam face 122 engaging the spring 118 while the switch 130 is rendered on only after the peak force of the spring 118 is exceeded. The latter providing a sufficient energization interval so as to exceed the maximum anticipated delay before actual commencement of the exposure phase of the operation.

Figure 7:
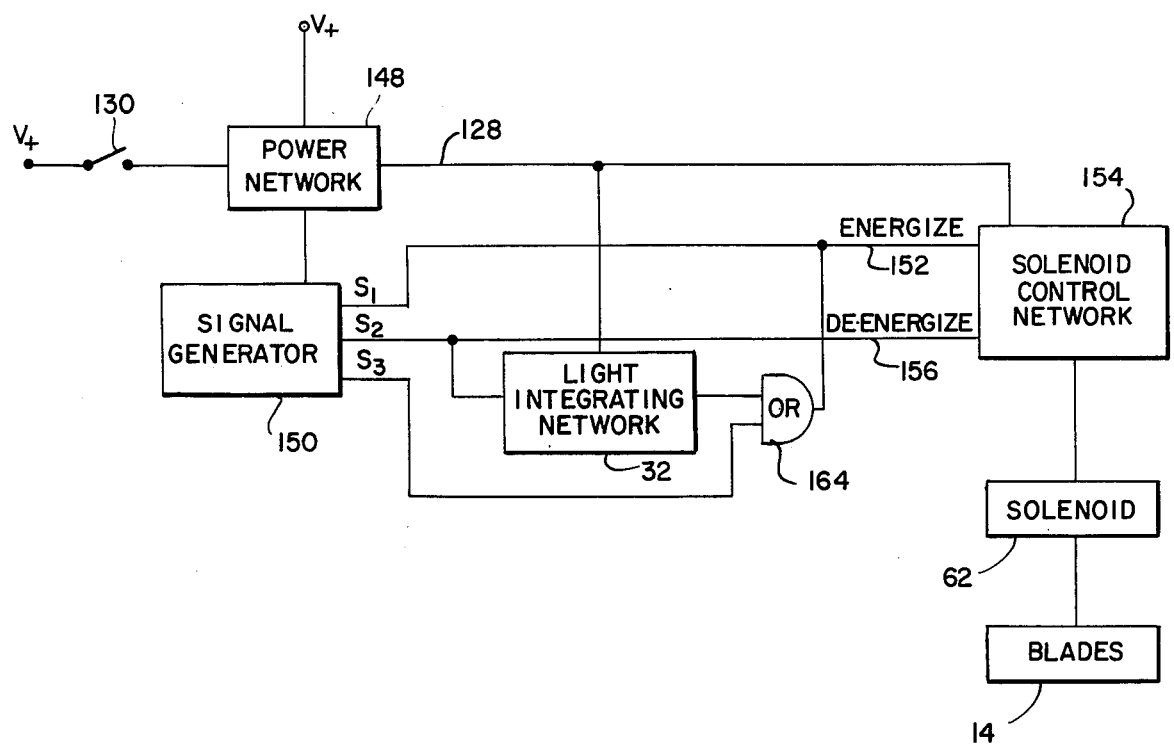
FIG. 7 is a block diagram showing the functional circuit relationships of the control system shown in FIG. 1.

An exemplary electrical circuit employed in the exposure control system will now be described with regard to FIG. 7. Therein a power network 148 is shown in connection to a signal generator 150, a solenoid control network 154 and the integrating network 32. The network 148 is operative in accordance with the on condition of the switch 130 to energize the generator 150, the networks 32 and 154 and to also trigger or activate the generator to produce three timed signals designated $S_1$, $S_2$ and $S_3$.

The power network 148 may take the form of a flip-flop circuit having a first state, (responsive to closing of the switch 130) which maintains power to the remainder of the system and a second state, (responsive to both completion of a designated photographic cycle and opening of the switch 130) in which the remainder of the system is isolated from the power source. Hence, the network 148 maintains power to the system until the two above noted conditions are met. Initially, the signal $S_1$ energizes the solenoid 62 by means of the solenoid control network 154, which is, for example, a flip-flop network capable of assuming one of two stable states either energizing or de-energizing the solenoid in accordance with signals on the input lines 152 or 156, respectively. Just following the $S_1$ signal, which further closes the shutter blades 14 so as to complete the release of the latch, the generator 150 automatically produces a second signal $S_2$ which, through line 156, deenergizes the solenoid 62 to allow opening of the blades 14 thereby initiating an exposure interval. In this arrangement, the light-integrating circuit 32 is also activated by the $S_2$ signal. However, it should be noted that the latter could be activated at any prior time, for example, directly from the network 148 since the blades 14 hold the circuit in a darkened condition until initiation of the exposure interval as explained in detail in the aforementioned U.S. Pat. NO. 3,820,128.

When sufficient light has been received by the photocell (not shown) of the network 32, the latter passes a signal through an "or" gate 164 to the line 152 so as to again energize the solenoid 62 which returns the blades 14 to a closed position to terminate the exposure interval. After a sufficient period of time, greater than the longest expected exposure interval, the generator 150 then produces a fail-safe signal $S_3$ which will also energize the solenoid to terminate the interval where the scene light is inadequate to trip the light-integrating network 32.

The timing of the generator signals $S_1$, $S_2$ and $S_3$ is dependent upon the camera arrangement in which the exposure system is employed. Where the illustrated system is employed to modify the single lens reflex (SLR) camera described in the aforementioned U.S. Patent to a non SLR use it should be understood that camera events occur both before and after the exposure interval. That is, the camera employs a pre-exposure phase in which the exposure chamber is altered from a viewing to an exposure condition, an exposure phase during which the exposure occurs, and a post-exposure phase during which the film is processed. Hence, even though the pre-exposure phase, which is in the order of 280 milliseconds, is not actually utilized with the presently described exposure control system, the time necessary to allow completion of this phase must be accomodated if minimum modification of the SLR camera is desired. Consequently while the $S_1$ signal may immediately follow the closing of the switch 130, the $S_2$ signal, which initiates the exposure interval, would be delayed in the converted camera for the 280 milliseconds to ensure that the exposure chamber is in condition for exposure. This time interval before initiation of the actual exposure is accomodated by the inherent delay in operator release of the system push button 102. Stated otherwise, the delay in operator release, (which would place the latch 70 in the blade path and preclude opening of the shutter-diaphragm) is made to exceed the time interval occurring between turning on of switch 130 and the $S_2$ signal which commences the actual exposure. For conversion of the above described SLR camera, this inherent delay in operator release slightly exceeds 280 milliseconds.

Once the blades have escaped from the latch, the pushbutton 102 can be released since the network 148 remains on until it receives both the turn off signal from the switch 130 and for example, a fourth signal from the generator 150, just following $S_3$, or from other elements of the camera.

Hence, if the push button 102 is released before completion of an exposure, the system will continue until it shuts itself down at which time the solenoid 62 is released and the blades captured by the latch 70. Conversely, if the pushbutton 102 is held down beyond the time necessary to complete a full cycle, (i.e., pre-exposure, exposure and post-exposure) the network 148 and the solenoid 62 remain energized until the operator releases the button which resets the latch 70 and opens the switch 130; at which time the blades are captured by the latch 70. Hence, the network 148, the generator 150 and the networks 32 and 154 provide control means energizeable or activatable for operating the blades through a predetermined program; or, that is, means for actuating the blade drive to first displace the blades to their terminal blocking position and then, after a predetermined interval, for displacing the blades toward their open position and back again to their terminal blocking position, and finally for displacing the blades to their latched, blocking position.

Since the latch arm 72 may be returned to its latching position shown in FIG. 2 (when the pushbutton 102 is released just following the commencement of the exposure interval) while the blades 16 and 18 are in the open position shown in bold lines in FIG. 1, the projection 50 will engage the latch arm 72 during the closing stroke of the solenoid 62 at the termination of the exposure interval. Consequently, the projection 50 is inclined with respect to the upper surface 84 of the latch arm 72 so as to cam the latter out of its latch position as the blades 16 and 18 are driven to their terminal blocking position. Hence, the cam surface, which alternately may be provided on the latch arm 72, provides means cooperating with the latch and blades for urging the latch from its latch position responsive to displacement of the blades past the latch and in a direction toward the blocking position.

The overall operation of the exposure control system will now be explained. As the camera operator depresses the pushbutton 102, the cam face 122 engages and passes over the spring 118. As the latter occurs or just subsequent thereto, the latch arm 72 is enabled and, hence, springs down from the position shown in FIG. 2 where its lateral arm 86 is held by the arm 116 of the section 110, to the position shown in FIG. 3. During this downward stroke, the top plate 84 of the latch arm 72 engages the beam projection 50 so that the beam 34 and hence the blades 14 remain latched. As the actuator 110 continues downward, the switch arm 132 is driven to its on position where it is latched within the detent 140.

Turning on of the switch 130 energizes the system and triggers the signal generator 150 which activates the solenoid 62. This rotates the walking beam 34 clockwise from the blade latch position shown in FIGS. 2 and 3 to the terminal blocking position shown in FIG. 4 thereby displacing the projection 50 from beneath the top plate 84 of the latch arm 72 which releases the latter, allowing it to drop clear of the path of the beam projection. Consequently, when the signal generator 150 then produces the $S_2$ signal which deenergizes the solenoid 62, the blades 14 are driven in an opening direction (see FIG. 1) under the bias of the spring 52 to define progressively increasing aperture values over the optical path 22 which transmits light to the focal plane and hence, initiates the exposure interval.

Coincident with the progressive opening of the main aperture, secondary aperture (not shown) is opened in tracking relation as set forth in the aforemention U.S. Pat. No. 3,820,128 so as to define a suitable exposure value as determined by the light-integrating network 32 which again energizes the solenoid 62 to terminate the exposure interval.

The latter energization of the solenoid 62 drives the blades 14 to their terminal blocking position shown in FIG. 4 and holds the blades in that position until the pushbutton 102 is released. In this regard, it should be noted that since the above sequence often occurs very rapidly, the button 102 may still be in a depressed condition, and the latch arm 72 out of the blade path or, that is, out of the path of the projection 50. As the operator releases the button 102, which returns to its inactive location under the urging of the spring portion 105, the actuator bar 104 lifts the latch arm 72 into the path of the projection 50 and then secondly releases the switch arm 132 to render the switch 130 non-conductive. Assuming the full cycle has been completed, turning off of the switch 130, in turn, shifts network 148 to its off condition and cuts power to the remainder of the system including the solenoid control network 154 which de-energizes the solenoid 62 and allows the blades to move in an opening direction to their latched position shown in FIG. 2 where they are retained in a de-energized, stable light-blocking condition in accordance with the spring bias of the blades against the latch.

Assuming the pushbutton 102 is released before the completion of the full camera cycle, (i.e., during or just at the end of the exposure interval) the system continues to operate until the network 148 receives its additional shut down signal at which time power is cut off and the blades captured by the latch 70.

Since certain changes may be made in the abovedescribed system and apparatus without departing from the scope of the invention herein involved, it is intended that all matter contained in the description thereof or shown in the accompanying drawings shall be interpreted as illustrative and not in a limiting sense.

What is claimed is:

1. A photographic exposure control system for a photographic camera, the camera having means for mounting photographic film material at a given focal plane, said system comprising a blade mechanism, means for mounting said blade mechanism for displacement along a given blade path between a blocking arrangement precluding transmission of scene light to the focal plane and an unblocking arrangement defining an aperture value through which scene light is transmitted to the focal plane, drive means actuatable for displacing said blade mechanism between its said arrangements, control means energizeable for actuating said drive means to initially displace said blade mechanism toward its said blocking arrangement and then, after a predetermined time, to displace said blade mechanism to its said unblocking arrangement and back again so as to define an exposure interval during which scene light is transmitted to the focal plane, latching means for precluding displacement of said blade mechanism from its said blocking position, said latching means including a latch member displaceable between a latch position wherein said latch member is located in said blade path and an unlatch position wherein said latch member is displaced from said path, and manually operative means for displacing said latch member to its said unlatch position, for energizing said control means to actuate said drive means, and for subsequently displacing said latch member back to its said latch position, said manually operative means including means for delaying the displacement of said latch member back to its said latch position for a time substantially equal to or exceeding said predetermined time so as to allow escape of the blade mechanism from the latch member as said blade mechanism is displaced toward its said unblocking arrangement to define said exposure interval.

2. The system of claim 1 wherein said latching means includes means for biasing said latch member toward its said unlatch position, said manually operative means includes an actuator member mounted for displacement between a first position wherein said latch member is retained by said actuator member in said latch position and a second position wherein said latch member is at least enabled for release from said latching engagement, and said delaying means includes means for resisting displacement of said actuator member to its said second position with a rising and then declining force sufficient to require deliberate actuation by said operator.

3. The apparatus of claim 1 wherein said blade mechanism and said latch member include cooperating means for retaining said latch member in its said latch position as long as said blade mechanism remains in engagement with said latch member so that said latch member, once enabled by said actuator, is released to its said unlatch position upon displacement of said blade mechanism toward its said blocking arrangement.

4. The apparatus of claim 1 wherein said manually operative means includes an actuator member displaceable in a given direction from a first position wherein said latch member is retained by said actuator member in its said latch position and a second position wherein said latch member is at least enabled for release from said latch position, said delaying means including a cam portion carried by said actuator member and a spring mounted alongside said actuator member and a configured for engagement with said cam portion at least during a portion of said displacement of said actuator member to its said second position, and said cam portion being formed to provide increasing and then decreasing deflection of said spring away from said actuator member as said actuator member is displaced to its said second position so as to provide a rising and then declining force resisting displacement of said actuator member to its said second position.

5. The system of claim 1 wherein said drive means is electrically actuatable, and said manually operative means includes a switch operable between a first condition wherein said drive means is de-actuated and a second condition wherein said drive means is actuated, an actuator member coupled to said which and displaceable between a first position wherein said switch is in its said first condition and a second position wherein said switch means is in its said second condition, and means for latching said switch in its said second condition until said actuator member is returned from its said second to substantially its said first position.

6. The apparatus of claim 1 wherein said blade mechanism comprises at least one blade member and a coupling member connected thereto, said blade member being configured for displacement between and blocking and unblocking arrangements in accordance with movement of said coupling member along a given path, and said latching means includes a latch member displaceable from a first position wherein said latch member is located in said given path and a second position wherein said latch member is displaced out of said given path, said drive means includes an electrically energizeable means connected to said coupling member and configured when energized for moving said coupling member in at least one direction along said given path, and said actuating means includes switch means configured for energizing said control responsive to operation of said actuating means.

7. The apparatus of claim 1 wherein said blade mechanism includes at least one blade member and a coupling member connected thereto, said blade member being configured for displacement between said blocking and unblocking arrangements in accordance with movement of said coupling member along a given path, and said latching means includes a latch member mounted for pivotal movement between a first position wherein said latch member is located in said given path of said coupling member and a second position wherein said latch member is displaced from said given path of said coupling member.

8. The apparatus of claim 1 wherein said blade mechanism includes a pair of blade members and an elongated coupling member having its distal ends connected to each of said blade members respectively and configured for displacement of said blade members between blocking and unblocking positions in accordance with pivotal movement of said coupling member in a given plane, said coupling member having a projection extending laterally to said given plane, and said latching means including a latch arm turned back at one end to form a C shaped portion and configured for displacement along a given path in a plane parallel to said given plane between a first position wherein said C shaped portion encompasses said projection and a second position wherein said C shaped portion is displaced from the path traversed by said projection during pivotal movement of said coupling member, said given path of displacement of said latch arm being configured to bring the C shaped portion of said latch arm into engagement with said projection when said projection is encompassed thereby so as to preclude disengagement of said latch arm from said coupling member until movement of said coupling member is a direction to displace said projection through the opening of and from within said C shaped portion, and said drive means including means actuatable to displace said coupling means from within said C shaped portion so as to allow displacement of said latch arm to its said second position.

9. The apparatus of claim 1 wherein said drive means includes means for biasing said blade mechanism in one direction toward its said unblocking arrangement and energizeable means for displacing said blade mechanism in an opposite direction toward said blocking arrangement, said latching means includes a latching member displaceable between a first position wherein said latching member precludes displacement of said blade mechanism in said one direction from said blocking arrangement and a second position wherein said latching member permits displacement of said blade mechanism in either direction, and said blade mechanism and said latching means includes cooperating means for camming said latch member from its said first position to permit passage of said blade mechanism responsive to displacement of said blade mechanism in said opposite direction.

* * * * *